United States Patent [19]

Highland et al.

[11] Patent Number: 5,271,091
[45] Date of Patent: Dec. 14, 1993

[54] ASYNCHRONOUS ARCHITECTURE FOR KNOWLEDGE-BASED SYSTEMS

[75] Inventors: Frederic D. Highland, New Midway; Christine T. Iwaskiw, Ellicott City; James D. Tani, Chevy Chase, all of Md.

[73] Assignee: International Business Machines Corporation, Armonk, N.Y.

[21] Appl. No.: 863,503

[22] Filed: Mar. 30, 1992

Related U.S. Application Data

[63] Continuation of Ser. No. 554,042, Jul. 13, 1990, abandoned.

[51] Int. Cl.$^5$ .............................................. G06F 15/18
[52] U.S. Cl. ........................................ 395/50; 395/51
[58] Field of Search ................................... 395/50, 51

[56] References Cited

U.S. PATENT DOCUMENTS

| | | | |
|---|---|---|---|
| 4,783,752 | 11/1988 | Kaplan et al. | 364/513 |
| 4,866,635 | 9/1989 | Kahn et al. | 364/513 |
| 4,924,408 | 5/1990 | Highland | 364/513 |
| 4,949,278 | 8/1990 | Davies et al. | 364/513 |

OTHER PUBLICATIONS

EXSYS, Inc., EXSYS EL, 1988 Users Manual, pp. A-13 to A-17 and brochure.
Sripada et al., "Application of Expert Systems to Process Problems", *Energy Processing/Canada*, Nov./Dec. 1985, pp. 26-31.
Parsaye et al., *Expert Systems for Express*, John Wiley & Sons, 1988, pp.
Raemmerer et al., "An Automated Reasoning Technique for Providing Moment-By-Moment Advice Concerning the Operation of a Process", *AAAI*-87, 6th *Nat'l Conf. on Artificial Intelligence*, Jul. 1987, pp. 1-5.
Hawkinson et al., "A Peal-Time Expert System for Process Control", *Artificial Intelligence Applications* in Chemistry, 1986, pp. 69-74.
Hirsch et al., "Interfaces for Knowledge-base Builders' Control Knowledge and Application Specific Procedures", IBM J. Research and Development 30(1), Jan. 1986, 29-37.

*Primary Examiner*—Michael R. Fleming
*Assistant Examiner*—Robert W. Downs
*Attorney, Agent, or Firm*—Lauren C. Bruzzone; Jesse L. Abzug

[57] ABSTRACT

An architecture and method for permitting knowledge-based systems to operate in an asynchronous manner is disclosed. A reasoning module includes a set of environment interface procedures which are customized for a specific complex system environment. This environment interface is compiled together with an inference engine and knowledge base to create an embeddable reasoning module.

3 Claims, 4 Drawing Sheets

ASYNCHRONOUS ARCHITECTURE FOR KNOWLEDGE-BASED SYSTEMS

This is a continuation of application Ser. No. 07/554,042, filed Jul. 13, 1990, abandoned.

BACKGROUND OF THE INVENTION

1. Field of the Invention

This invention relates to knowledge-based or expert systems. In particular, an architecture and method which facilitate the embeddability of knowledge-based systems within a complex hardware and software environment are disclosed.

2. Background Information

Conventional, commercially available knowledge-based systems, of which IBM's Expert System Environment is one of many examples, operate in what is known as a synchronous mode. That is, they are invoked to solve a problem, inferencing occurs, a conclusion is reached and the knowledge-based system is terminated. In larger, more complex environments, it is sometimes necessary to operate asynchronously and in real-time transactional interaction with other processes in the complex environment. In order to accomplish this, it is necessary to have a knowledge-based system that is asynchronous in architecture, modular in nature, and can save the state of its inferencing in between activations from the complex environment.

OBJECTS OF THE INVENTION

It is therefore, an object of the invention to provide an architecture for a knowledge-based system that facilitates its embeddability into a complex hardware and software environment.

It is a further object of this invention to provide an architecture which will permit a knowledge-based system to operate asynchronously.

It is still another object of the invention to provide an architecture in which the environment interface is modular and can be bound to the knowledge-based system.

It is still another object of this invention to provide a method for creating a reasoning module which is embedded in a complex system environment.

SUMMARY OF THE INVENTION

These, and other objects which shall be readily apparent to those knowledgeable in the art, are accomplished by the present architecture and method in which a reasoning module can be created and conveniently incorporated into a complex system environment comprising computer hardware and software. The reasoning module is a combination of generated source code and environment interface procedures which are bound together. The generated source code is, in turn, a combination of a knowledge base and inference engine, which are also bound together. The implementation of the knowledge-based system as generated source code is the current embodiment of the invention. This implementation, however, is not the only one, and other implementations, such as a knowledge base interpreted by an inference engine, are equally applicable.

BRIEF DESCRIPTION OF THE DRAWINGS

The foregoing, and other advantages of the invention will be more fully understood with reference to the description of the preferred embodiment and with reference to the drawing wherein.

DESCRIPTION OF THE PREFERRED EMBODIMENT

The invention will now be described in relation to the expert system product called "The Integrated Reasoning Shell" (a trademark of International Business Machines Corporation). The Integrated Reasoning Shell is a product that offers integrated forward and backward inferencing and is the subject of one issued patent and two co-pending applications. U.S. Pat. No. 4,924,408, issued on May 8, 1990, entitled "Technique for Compilation of Knowledge Bases", and assigned to the assignee of this invention, discloses a method for converting a knowledge base and inferencing technique into compilable program code. This compiled program code is referred to as "generated source code" in this patent application. U.S. Pat. No. 5,159,662, issued on Oct. 27, 1992, entitled "System and Method for Building a Computer-Based RETE Pattern Matching Network", and assigned to the assignee of this invention, discloses a novel approach for generating RETE networks which permit the designer to organize the knowledge base in an optimal fashion. U.S. Pat. No. 5,119,470, issued on Jun. 2, 1992, entitled "Computer-Based Inference Engine Device and Method Thereof For Integrated Backward Chaining and Forward Chaining Reasoning", and assigned to the assignee of this invention, discloses the technique for integrating backward chaining and forward chaining. The disclosures of the two co-pending applications and the issued patent are incorporated in their entirety into the specification of this application.

Figure 1:
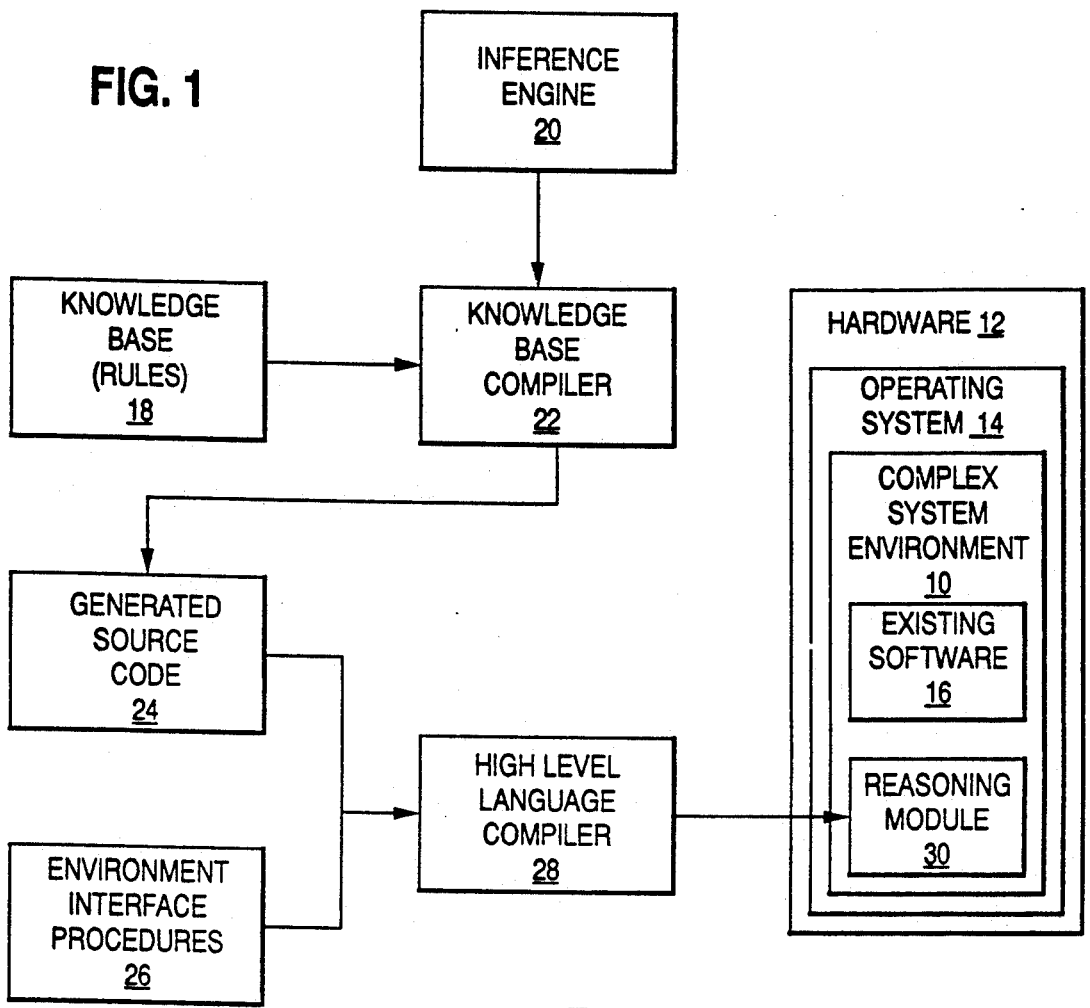
FIG. 1 is a block diagram showing the creation of the reasoning module.

Referring to FIG. 1, The Integrated Reasoning Shell (TIRS) is a tool for developing knowledge-based application for embedded and real-time environment. TIRS provides both a means to create knowledge-based applications that exhibit high performance, and the ability to closely integrate these applications into existing complex system environments in a transparent manner. A complex system environment 10, for purposes of this description, includes computer hardware 12 running an operating system 14 and application software 16. In the preferred embodiment, the hardware is an IBM Personal System/2 computer and the operating system is the Operating System/2. (IBM, Personal System/2, and Operating System/2 are trademarks of International Business Machines Corporation.) The existing application software 16 can be any application running on the hardware and is not critical to this invention. It will also be understood by those skilled in the art that the hardware and software environment described is not critical to this invention and may be any suitable environment currently available or available in the future.

The complex system environment 10 is a fully integrated system with many layers and levels of hardware and software interacting and communicating with each other. To make the expert system modular, so that it can be readily embedded in various complex system environments without significant modification, a knowledge base 18, and inference engine 20 are compiled together by knowledge base compiler 22 to create generated source code 24. Generated source code 24 is a "universal" module that can be "plugged" into any kind of complex system environment, providing proper interfaces between the generated source code 24 and the specific complex system environment 10, are available.

This is where the significance of the invention can be realized. Since different complex system environments will have different interface requirements for passing data, parameters, commands, interacting with user, etc., these interface requirements have also been modularized into an environment interface procedures module 26. By modularizing these environment interface procedures 26, it is apparent that when one wishes to embed the generated source code 24 in a different complex system environment 10, all that is needed is to create or modify the environment interface procedure 26, rather than having to recreate the entire generated source code 24. The two modular components, the generated source code 24 and the environment interface procedures 26, are then bound together by high-level language compiler 28 to form the reasoning module 30, which then can be embedded in the complex system environment 10.

High-level language compiler 28 can be any conventional language compiler that is compatible with the language of the complex system environment 10. For example, if the complex system environment 10 is written in the "C" computer language, then high-level language compiler 28 would be a "C" compiler.

Figure 2:
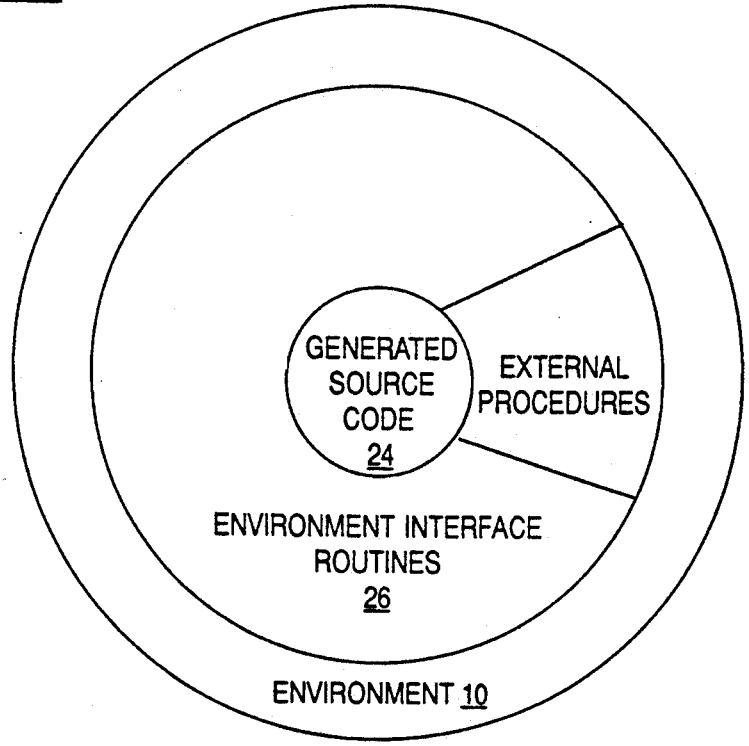
FIG. 2 is a schematic representation of the reasoning module as it fits in the complex system environment.

FIG. 2 shows a different representation of the modular architecture herein described. In the inner circle is shown the modular generated source code 24 which contains the inferencing logic for the expert system. Wrapped around this modular core is the environment interface routine or procedures 26, which are the interface between the generated source code and the complex system environment 10, shown as the outer circle.

TIRS converts a knowledge base into high-level language code that is functionally equivalent to the operations performed by the inference engine on a knowledge base in a traditional knowledge-based or expert system. The generated source code contains the inferencing mechanisms, as well as knowledge, from the knowledge base. The code may then be compiled and bound, or linked, with environment interface procedures to form a reasoning module. Because of its transactional architecture, the reasoning module can be embedded into the complex system environment 10 and interact with the asynchronous processes within the complex system environment. Embedded refers to the state of an application that is fully integrated within a complex system.

The environment interface 26 is comprised of external procedures and routines that permit the reasoning module to interface with the target complex system environment and contain all system specific interface information. The resulting reasoning module can exist in a complex system that has a transactional architecture, as well as, in a system with a traditional, sequential or batch architecture.

In a sequential architecture a process has control and interacts synchronously with the other processes in the system. After completing a function or functions, the process terminates and passes control to another process. In a synchronous environment, one program module usually has control. All other program modules are subroutines that are called by the main module. This is typical of batch and off-line processing environments.

When operating in a synchronous environment, a reasoning module 30 is a synchronous program, or subroutine, that executes on the complex system environment. A reasoning module executing in a synchronous environment can operate as a stand-alone application or as as subroutine of a controlling program.

In a transactional architecture, most processes interact asynchronously with each other. Many processes may be active at the same time as opposed to one process having control of all resources. Each process must react to data messages that occur within the complex system environment. Between data messages, the process is dormant, preserving its state with retained data and freeing resources for use by other processes. In an asynchronous environment, the processes can be viewed as state machines which change states depending on the flow of data in the system. This is typical of real-time and interactive environments.

Figure 3:
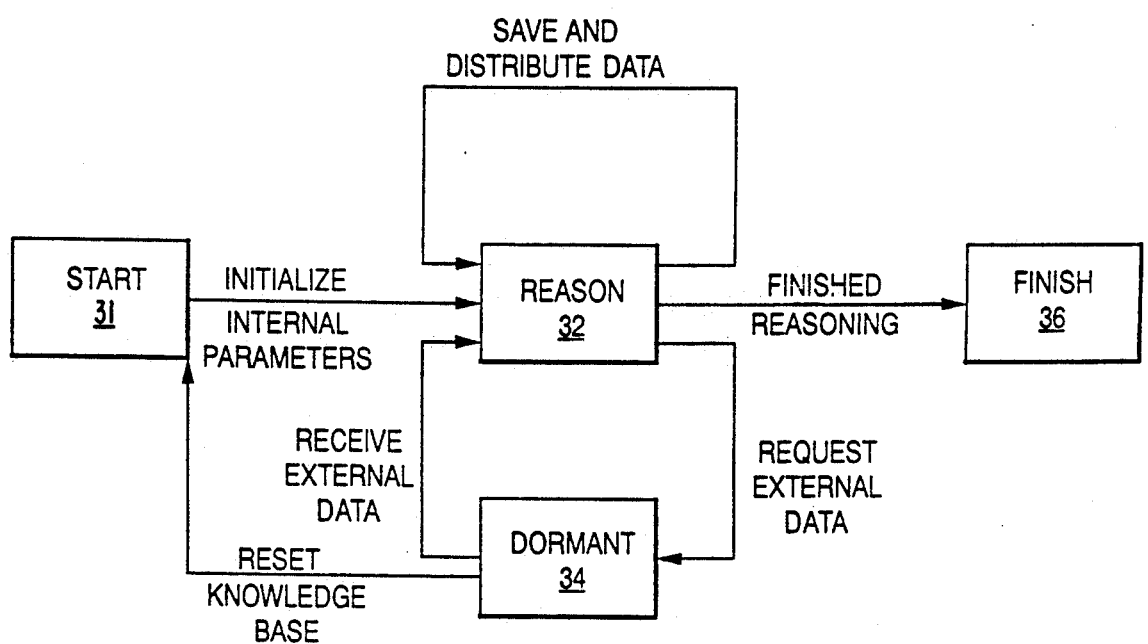
FIG. 3 is a block diagram showing the processing flow within the reasoning module.

FIG. 3 shows a state diagram of a TIRS created reasoning module. Upon starting or activation (START block 31) the reasoning module is activated by certain data messages in the system. These data messages are identified by the knowledge base as initialization messages. These initialization messages start the reasoning process identified as REASON block 32. During the reasoning process, internal parameters are initialized and propagated to the reasoning procedures. Rules may fire as appropriate and forward chaining data may be requested from the complex system environment. The data is obtained from asynchronous information sources within the complex system environment, as well as from synchronous data sources. The reasoning module may also request backward chaining data from the system environment. After issuing any data requests, the reasoning module enters a dormant state represented by DORMANT block 34 until the necessary data is available. In that DORMANT state 34, the reasoning module does not need the resources of the system environment, thus freeing them for use by other applications in the system. In this mode of operation, utilization of critical resources is minimized.

When data is available from the system, reasoning module re-enters an active or reasoning state and receives the data. The data is then propagated to the reasoning procedures and any actions necessary to update the knowledge base data are performed. If additional data are required, then the reasoning module reenters the DORMANT state. Once the reasoning process is finished, the reasoning module enters a FINISH state 36, thereby freeing up the system resources.

Figure 4:
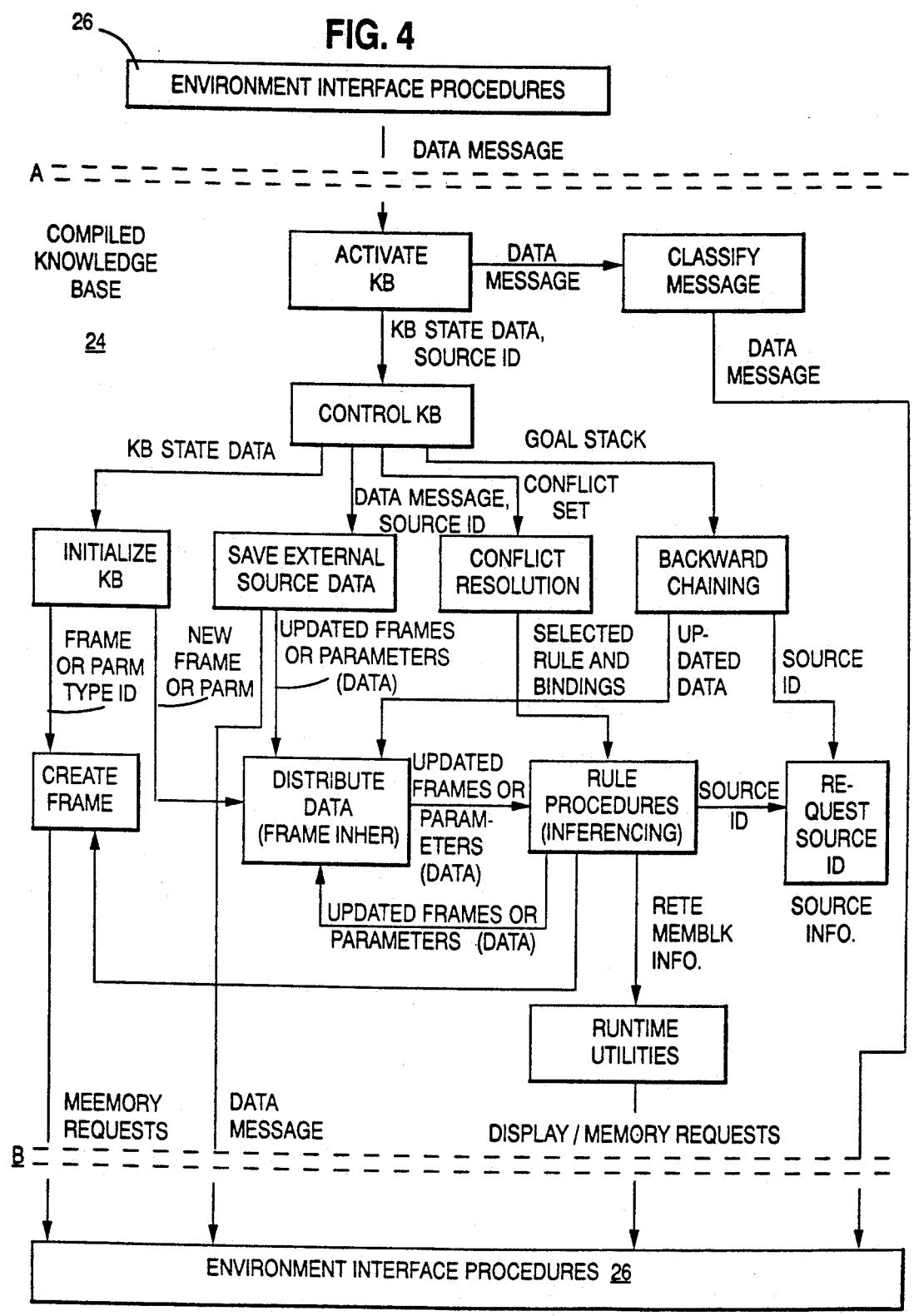
FIG. 4 is a block diagram showing the architecture of the reasoning module.
Figure 5:
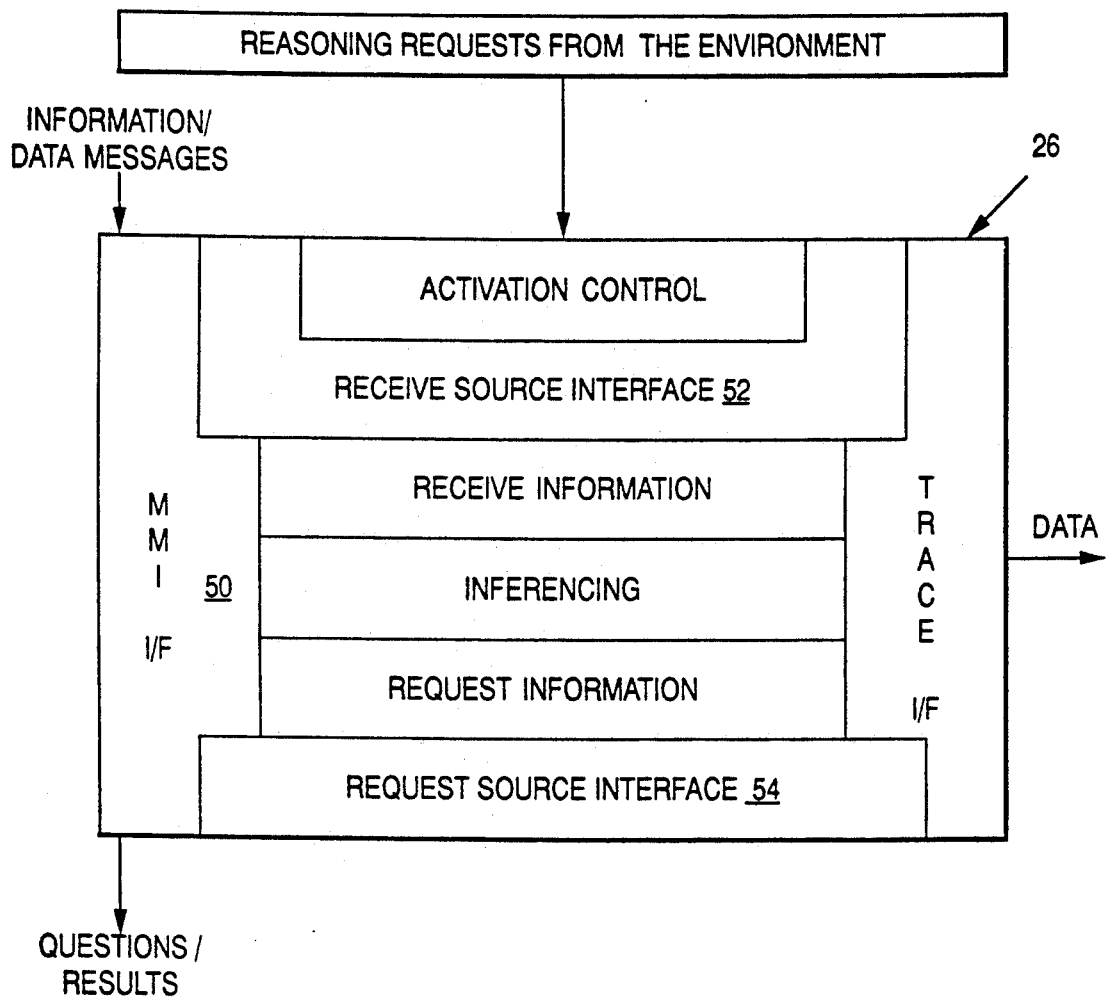
FIG. 5 is a schematic representation of the modular environment interface architecture.

The reasoning module is designed to use the man-machine interfaces 50 provided by the complex system environment, as shown in FIG. 5. The control architecture of the reasoning module allows it to interact with a real-time command and control environment. The main components of the reasoning module are shown in FIG. 4. The generated source code 24 is represented by those functions between lines A and B. The environment interface procedures are represented by the blocks above line A and below line B. The generated source code 24 consists of:

1. Initialization procedures, which initialize internal parameters and request forward chaining data;
2. Inferencing or reasoning procedures, which perform the inferencing or reasoning function of a knowledge-based application;

3. Data distribution procedures, which control data storage and the distribution of data to the inferencing (goal) procedure;
4. Request data procedures, which contain routines that formulate data requests to the complex system; and
5. Receive data procedures, which extract the data from the complex system and prepare it for use by the reasoning module.

The environment interface procedures 26 contain code that interfaces with the complex system environment directly. This includes procedures that perform:
1. Interaction with the environment's tasking structure;
2. Memory allocation and management;
3. Trace and statistics output; and
4. Data acquisition.

The environment interface 26 is designed to be a modular, so that if the knowledge engineer needed to port his application to another environment, he need only modify the environment interface procedure to replace the system's specific commands with the commands relevant to the new environment. In addition, if a knowledge engineer wanted a fancier user interface, he could modify the existing environment interface with sophisticated graphics.

The reasoning module accepts data and requests from system man-machine interface functions and uses interfaces 52, 54 provided by the system to provide any data necessary. All input and output to the user and the rest of the complex system is performed by service routines existing in the complex system. This approach allows knowledge engineers to concentrate on knowledge-based development, as opposed to interface design. The knowledge engineer, or system installer, however, may choose to write his or her own interface procedures and use them instead of the interface procedures provided by the complex system. Because the reasoning module does not contain interface or hardware specific software, it is hardware independent.

The environment interface routines are divided into three groups: 1. Task interface routines; 2. Primary environment interface routines; and 3. Secondary environment interface routines. Task interface routines are those routines that interface with the complex system environment before and after execution of the inferencing logic of the reasoning module.

Control is passed to the task interface from the system environment to: 1. perform environment initialization; 2. locate or allocate data for the inferencing logic; and 3. pass control to the inferencing logic. During this stage, the inferencing logic runs, and control can be passed back and forth any number of times from the inferencing logic to, either the test interface, or an environment interface routine and back again to the inferencing logic. If the inferencing logic needs to perform an environment specific function, control is passed to an environment interface routine to perform that function. When the inferencing logic is finished processing rules, control is passed back to the task interface, allowing it to pass to the inferencing logic any messages from the environment that it has received. When the inferencing is done, control is passed to the task interface to perform any needed cleanup that is specific to an environment into a retain or freeze state data.

Appended here are several examples of environment interface routines. These are provided as examples and are not to be construed as an exhaustive list of all environment interface routines that can be created. The format is unique to the preferred embodiment, and is not critical to the invention as a whole. Additional samples of environment interface routines can be found in the Integrated Reasoning Shell Reference Manual available from IBM Corporation which is incorporated by reference.

Assert Instance (ICEINSA)

This routine allocates memory storage for an object in the knowledge base of a given size. The address of the knowledge base's state data can be used, if needed.

| Input | object_size | size of knowledge base object |
|---|---|---|
| | kb_state_data | pointer to knowledge base state data |
| Output | instance_ptr | pointer to memory for knowledge base object |
| | rc | return code |
| Include File | ICESTYP | |

Format
include<ICESTYP>
void ICEINSA (object_size, kb_state_data, instance_ptr, rc);
 short int    object_size;
 kbs          *kbs;
 void         **instance_ptr;
 long int     *rc;

Description

The Assert Instance routine allocates an area of storage of object_size bytes from memory provided by the environment for knowledge base state data. The rc is set to a value of 0 and instance_ptr is set to the address of the allocated storage if the allocation was successful and non-zero otherwise.

The memory requested with this routine is used during execution of the Inferencing Logic, and must be retained with the knowledge base state data across transactions of the Inferencing Logic.

Retract Instance (ICEINSR)

Given the address of a knowledge base object (for example, a frame instance), this routine frees the memory storage that was allocated for that object.

| Input | object_size | size of knowledge base object |
|---|---|---|
| | kb_state_data | pointer to knowledge base state data |
| Output | instance_ptr | pointer to memory for knowledge base object |
| | rc | return code |
| Include File | ICESTYP | |

Format
include<ICESTYP>
void ICEINSR (object_size, kb_state_data, instance_ptr, rc);
 short int    object_size ;
 kbs          *kb_state_data;
 void         **instance_ptr ;
 long int     *rc            ;

Description

The Retract Instance routine frees an area of storage of object_size bytes located at instance_ptr, making that memory available to the memory provided by the environment for knowledge base state data. The rc is set to a value of 0, if the de-allocation was successful and non-zero otherwise.

Request Synchronous Question Source (ICERSQ)

Sends out a request for a synchronous question source, and waits for a response before returning control to the Inference Logic.

| Input | env_spec_facets | environment specific facets |
| | facet_count | number of environment specific facets |
| | arguments | input and output arguments for question source |
| | argument_count | number of arguments |
| | kb_state_data | pointer to knowledge base state data |
| Output | rc | return code |
| Include File | ICESTYP | |

Format
include<ICESTYP>
void ICERSQ (env_spec_facets, facet_count, arguments, argument_count, kb_state_data, rc);
    facet_data_block   *env_spec_facets;
    short int   facet_count;
    argument_data_block   *arguments;
    short int   argument_count;
    kbs   *kb_state_data;
    long int   *rc;

Description

The Request Synchronous Question Source routine presents a question(s) to the user using the data specified in env_spec_facets (an array of facet_count elements) and arguments (an array of argument_count elements). The routine then requests an answer to the question(s) and places the results in the output values contained in the arguments array.

If the Question Source can be properly requested, rc is set to 0. If problems occur during the request process, rc is set to a non-zero value that indicates the nature of the problem.

All information in the arguments env_spec_facets, and arguments may not be needed for a given implementation, but are provided in order to assist the Environment Interface in describing and identifying the question to be requested.

Request Synchronous Procedure Source (ICERSP)

This routine sends out a request for a synchronous procedure source, and waits for a response before returning control to the Inferencing Logic.

| Input | src_name | external source name |
| | env_spec_facets | environment specific facets |
| | facet_count | number of environment specific facets |
| | arguments | input and output arguments for question source |
| | argument_count | number of arguments |
| | kb_state_data | pointer to knowledge base state data |
| Output | rc | return code |
| Include File | ICESTYP | |

Format
include <ICESTYP>
void ICERSP (src_name, facets, facet_count, arguments, argument_count, kb_state_data, rc);
    char   *src_name ;
    facet_data_block   *env_spec_facets ;
    short int   facet_count ;
    argument_data_block   *arguments ;
    short int   argument_count ;
    kbs   *kb_state_data ;
    long int   *rc ;

Description

The Request Synchronous Procedure Source routine invokes the software specified by src_name using the data specified in env_spec_facets (an array of facet_count elements). The invocation is done in a manner such that the execution of the knowledge-based application is suspended until the invoked software completes execution. Upon completion of the invoked software, this routine places the returned results in the output values contained in the arguments array.

If the procedure source can be properly requested, rc is set to 0. If problems occur during the request process, rc is set to a non-zero value that indicates the nature of the problem.

All information in the arguments env_spec_facets, and arguments may not be needed for a given implementation, but are provided in order to assist the Environment Interface in describing and identifying the procedure to be requested.

Request Asynchronous Question Source (ICERAQ)

This routine handles the Inferencing Logic requests for the environment to evaluate a question source asynchronously. In the case of any asynchronous source requests, the details of those requests must be stored for later use, since these sources are not immediately evaluated.

| Input | src_id | source return id |
| | env_spec_facets | environment specific facets |
| | facet_count | number of environment specific facets |
| | arguments | input arguments for question source |
| | argument_count | number of input arguments |
| | anchor_id | frame instance id |
| | instance_id | knowledge base instance (object) id |
| | kb_state_data | pointer to knowledge base state data |
| Output | rc | return code |
| Include File | ICESTYP | |

Format
include <ICESTYP>
void ICERAQ (src_id, env_spec_facets, facet_count, arguments, argument_count, frame_id_instance_id kb_state_data,rd);
    short int   scr_id;
    facet_data_block   *env_spec_facets;
    short int   facet_count;
    argument_data_block   *arguments;
    short int   argument_count;
    short int   *anchor_id;
    short int   *instance_id;
    kbs   *kb_state_data;
    long int   *rc;

Description

The Request Asynchronous Question Source routine presents a question(s) to the user using the data specified in env_spec_facets (an array of facet_count elements) and arguments (an array of argument_count elements).

If the Question Source can be properly requested, rc is set to 0. If problems occur during the request process, rc is set to a non-zero value that indicates the nature of the problem.

The answers to the question(s) are not returned to the Inferencing Logic as a result of this call but are returned through the Task Interface at a later point in time.

All information in src_id, env_spec_facets, and arguments may not be needed for a given implementation, but are provided in order to assist the Environment Interface in describing and identifying the question to be requested.

The arguments anchor_id and instance_id must be returned to the caller when the Environment Interface is invoked for Extract Source processing and must be retained by the environment in some way.

Request Asynchronous Procedure Source (ICERAP)

This routine handles the Inferencing Logic requests for the environment to evaluate a procedure source asynchronously. In the case of any asynchronous source requests, the details of those requests must be stored for later use since those sources are not immediately evaluated.

| Input | src_id | source's return id |
|---|---|---|
|  | src_name | external source name |
|  | env_spec_facets | environment specific facets |
|  | facet_count | number of environment specific facets |
|  | arguments | input arguments for question source |
|  | argument_count | number of input arguments |
|  | anchor_id | frame instance id |
|  | instance_id | knowledge base instance (object) id |
|  | kb_state_data | pointer to knowledge base state data |
| Output | rc | return code |
| Include File | ICESTYP | |

Format
include <ICESTYP>
void ICERAP (src_id, src_name, env_spec_facets,
facet_count, arguments, argument_count,
anchor_id, instance_id, kb_state_data, rc);
  short int    src_id;
  char    *src_name;
  facet_data_block    *env_spec_facets;
  short int    facet_count;
  argument_data_block    *arguments;
  short int    argument_count;
  short int    *anchor_id;
  short int    *instance_id;
  kbs    *kb_state_data;
  long int    *rc;

Description

The Request Asynchronous Procedure Source routine invokes software identified by src_name to acquire data for Source id using the data specified in env_spec_facets (an array of facet_count elements) and arguments (an array of argument_count elements).

If the procedure source can be properly requested, rc is set to 0. If problems occur during the request process, rc is set to a non-zero value that indicates the nature of the problem.

The software invoked by the routine is normally a separate task or asynchronously operating process that is independent of the current task or process. The results of the invocation are not returned to the Inferencing Logic as a result of this call, but are returned through the Task Interface at a later point in time.

All information in src_id, src_name, env_spec_facets, and arguments may not be needed for a given implementation, but are provided in order to assist the Environment Interface in describing and identifying the procedure to be requested.

The arguments anchor_id and instance_id must be returned to the caller when the Environment Interface is invoked for Extract Source processing and must be retained by the environment in some way.

Message is a Question Source (ICEISQ)

Given a message that was received from the environment, this routine determines if the message is a data message from a question source. It is used to identify asynchronous questions.

| Input | message | pointer to a message received from environment |
|---|---|---|
|  | kb_state_data | pointer to knowledge base state data |
| Output | src_id | external source id |
|  | rc | return code |
| Include File | ICESTYP | |

Format
include <ICESTYP>
void ICEISQ (message, kb_state_data, src_id, rc);
  void    *message;
  kbs    *kb_state_data;
  short int    *src_id;
  long int    *rc;

Description

The Message Is a Question Source routine examines message, a data area passed to the Inferencing Logic from the environment, to determine if it is a response to a question source. If message is a question source, rc is set to 0 and a unique identifier from from the message is returned in src_id. If the message is not a Question source, rc is set to 1.

The identification of a message as a question source and the location of contents of the unique identifier are environment- and implementation- dependent.

Message Is A Procedure Source (ICEISP)

Given a message that was received from the environment, this routine determines if the message is a data message from a procedure source. It is used to identify asynchronous procedures.

| Input | message | pointer to a message received from environment |
|---|---|---|
|  | kb_state_data | pointer to knowledge base state data |
| Output | src_id | external source id |
|  | rc | return code |
| Include File | ICESTYP | |

Format
include <ICESTYP>
void ICEISP (message, kb_state_data, src_id, rc);
  void    *message;
  kbs    *kb_state_data;
  short int    *src_id;
  long int    *rc;

Description

The Message Is a Procedure Source routine examines message, a data area passed to the Inferencing Logic from the environment, to determine if it is associated with a procedure or KB source. If message is associated with a procedure or KB source, rc is set to 0 and a unique identifier from the message is returned in srd_id. If message is not associated with a procedure or KB source, rc is set to 1.

The identification of a message as a procedure or KB source and the location and contents of the unique identifier are environment- and implementation- dependent.

Extract Question Source Data (ICEEXTQ)

This routine extracts the values of the questions source's return arguments from the data message returned by question source. These are the values returned in the Answers facet of a question source. This routine also extracts the identifier of the knowledge base instance (object) associated with the request for that source.

| Input | data_message | pointer to data message received from environment |
|---|---|---|
| | src_id | external source id |
| | env_spec_facets | environment specific facets |
| | facet_count | number of environment specific facets |
| | arguments | output arguments for question source |
| | argument_count | number of output arguments |
| | kb_state_data | pointer to knowledge base state data |
| Output | anchor_id | frame instance id |
| | instance_id | id of instance associated with current source |
| | rc | return code |
| Include File | ICESTYP | |

Format

```
#include <ICESTYP>
void ICEEXTQ (data_message, src_id, env_spec_facets,
   facet_count, arguments, argument_count,
   kb_state_data, anchor_id, instance_id,
   rc);
   void                *data_message;
   short int           src_id;
   facet_data_block    *env_spec_facets;
   short int           facet_count;
   argument_data_block *arguments;
   short int           argument_count;
   kbs                 *kb_state_data;
   short int           *anchor_id;
   short int           *instance_id;
   long int            *rc;
```

Description

The Extract Question Source Data routine examines the data from a question source response located at data_message for question source src_id and extracts the data values required. The data values are specified as output arguments in the array arguments of length argument_count.

Each output argument required is copied from the appropriate location in data_message to storage provided for it in the arguments array. Analysis of the data may be further modified by the specifications contained in env_spec_facets (an array of facet_count elements) that contain Environment Specific facet specifications associated with the source.

The values of anchor_id and instance_id, which were passed with the question request and retained by the environment in some way, are returned to the caller.

If the requested data can be extracted from message, rc is set to 0. If problems occur during the extraction process, rc is set to a non-zero value that indicates the nature of the problem.

While the invention has been particularly shown and described with reference to a preferred embodiment thereof, it will be understood by those skilled in the art that various changes in detail may be made therein without departing from the spirit, scope and teaching of the invention. For example, the invention is operable with any knowledge-based inferencing system, whether compiled or not. Accordingly, the architecture and method herein disclosed is to be considered merely as illustrative, and the invention is to be limited only as specified in the claims.

What is claimed is:

1. A computer system for processing a plurality of application programs, including at least one knowledge-based inferencing program comprising:

means for storing data, including at least one knowledge-based inferencing program and other application programs and data associated therewith, said at least one knowledge-based inferencing program having at least one knowledge base and inference engine compiled together, and a set of environment interface procedures further linked together with said inferencing program to form a reasoning module, said environment interface procedures including a set of program routines customizable to permit communication between said inferencing program and the user or other application programs that require knowledge-based inferencing; and means for processing the data stored in the storage means, said processing means including means for processing said plurality of application programs, means for distributing data among said plurality of programs, and means for communicating with a user, said application program processing means acting in conjunction with the reasoning module to perform inferencing at the request of one or more of the other application programs or a user, said means for distributing data sending the request to perform inferencing and requesting any data required for the inferencing process from the application programs in an asynchronous manner utilizing the environment interface procedures, said communicating means sending a user initiated request for inferencing and providing any other communication required between a user and the application program processing means, said application program processing means continuing to perform inferencing while obtaining data from other application programs or a user without having to sit idle while waiting for additional data, and said application program processing means continuing to perform inferencing while requesting data from other application programs or a user without having to sit idle while waiting for additional data.

2. The computer system as claimed in claim 1 wherein said environment interface procedures including program routines to manage state data and receive data asynchronously from other application programs or a user, and said processing means cooperate with the program routines to manage state data and pass data within the system.

3. The computer system as claimed in claim 1, wherein the knowledge-based inferencing program is capable of entering a dormant state for one of a plurality of simultaneous inferencing processes while the processing means continues other inferencing processes.

* * * * *